April 12, 1955

J. E. ORTLOFF ET AL 2,706,104

GRAVITY-MOMENTUM RECIRCULATION
PELLET IMPACT DRILLING BIT

Filed Jan. 29, 1952

John E. Ortloff
Ernest C. Fitch, Jr. Inventors

By W. O. Tilman Attorney

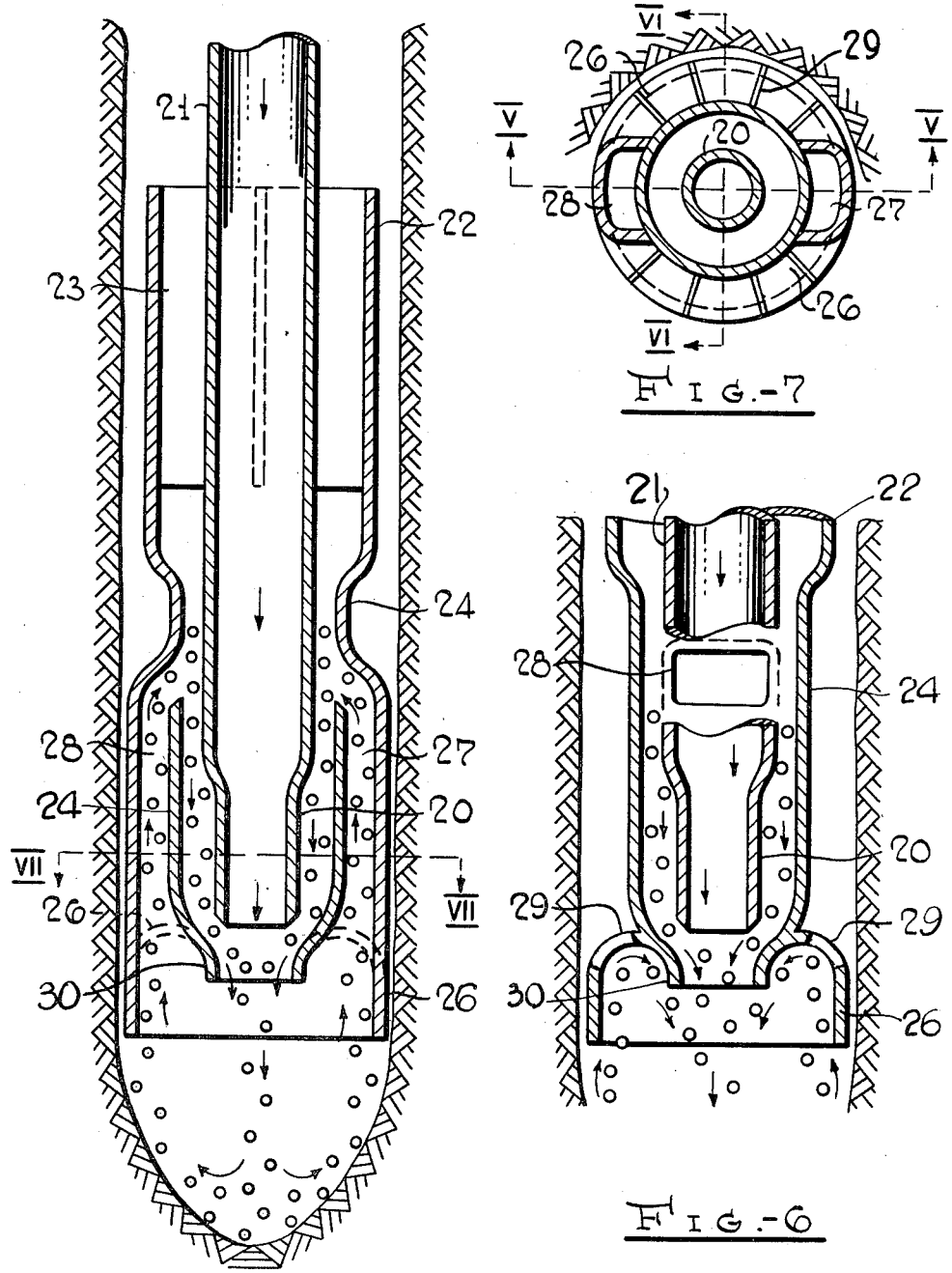

United States Patent Office 2,706,104
Patented Apr. 12, 1955

2,706,104

GRAVITY-MOMENTUM RECIRCULATION PELLET IMPACT DRILLING BIT

John E. Ortloff and Ernest C. Fitch, Jr., Tulsa, Okla., assignors to Esso Research and Engineering Company, a corporation of Delaware Application January 29, 1952, Serial No. 268,893

8 Claims. (Cl. 255—61)

This invention concerns a novel form of drill bit employing the impact of a multitude of high velocity directed pellets as the drilling agent. The invention particularly concerns a method and apparatus used to secure efficient recirculation of the pellets adjacent the drilling zone. Towards this end means are disclosed and claimed to redirect the greater portion of the pellets for recirculation so as to employ at least a portion of the momentum of the pellets. In combination with this type of circulation, a gravity separation zone is employed to insure complete recycling of all pellets and to provide a method for introducing new pellets as required. The invention therefore concerns the basic combination of "momentum pellet recirculation" with "gravity pellet recirculation."

The basic principles of pellet impact drilling are fundamentally simple. Means are simply required to provide a jet of high velocity fluid including provision for entraining and accelerating pellets in this jet of fluid. The requisites of this drilling procedure concern the nature of the pellets employed, and the fluid employed therewith as a propelling and recirculation agent for the pellets.

The pellets to be employed must be of substantial size. Thus it has been found that granular pellets or pellets having a diameter less than about ⅛ of an inch are relatively ineffective in drilling. In general the rate of drilling attainable increases as the size of the pellets is increased. For this reason it is generally preferred to employ the largest pellets possible, consistent with the nozzle size of the apparatus and the fracturing characteristics of the pellets. As will be emphasized, the nature of the drilling fluid employed also has a bearing on the size of the pellets. However, it may be stated that when employing a gas, such as air, for the drilling fluid, pellets of about ⅛ to a quarter of an inch in diameter are to be employed. When using a liquid, such as water or drilling mud, as the drilling fluid, the pellets may range in size from about ¼ to 1 inch. The preferred size range in this case is between ½ and ¾ of an inch.

It is important that the pellets have the greatest practical density. It is apparent that the greater the density of a given sized pellet the greater the kinetic energy which can be attained and the greater the impact force which can be developed. Again, as will be brought out, the separation characteristics of the pellets from the drilling fluid employed play an important part in drilling efficiency. Since the separation rate of the pellets from a fluid depends in part upon the density of the pellets, it is apparent that this factor again dictates use of a high density pellet.

The configuration and surface characteristics of the pellets are also important. The pellets should be substantially spherical in nature and should have a smooth surface so as to limit wear of the jet nozzle assembly through which the pellets are to be ejected. In this connection it is fundamental that a spherical body possesses the best resistance to fracture due to impact; no other shape possesses the mechanical strength of a sphere. The factors of spherical configuration and smooth surface also relate to the separation characteristics of the pellets from the entraining fluid as will be noted below.

In view of these considerations the pellets to be employed are generally metal spheres having the desired properties of impact resistance, hardness, and toughness. Iron, steel and other ferrous alloys may be employed to prepare the pellets. In this connection, however, it should be observed that it is essential that the metal chosen be non-brittle in character. Thus, for example, finished ball bearings have been found to be impractical for use in this invention although ball bearing blanks obtained prior to surface hardening are satisfactory. Due to their high density, tungsten carbide alloys of the less brittle character are attractive for use in the pellets to be employed. Again, alloys of this character or other dense metals may be employed as a pellet core material, surfaced by ferrous alloys having the requisite toughness.

As suggested heretofore, the separation characteristics of the pellets from the drilling fluid play an important part in the efficiency of pellet impact drilling. It is apparent that in jetting a stream of fluid, entraining the pellets referred to, against a formation to be drilled, it becomes important that the pellets readily separate from this stream of fluid. This is required so that the pellets will not be cushioned by the fluid and will not be inefficiently swept from the drilling zone in the fluid flow stream. Again, regardless of the type of pellet recirculation employed, it becomes necessary in some manner to subsequently secure separation of pellets from an upward flow of drilling mud in the bore hole for return and recirculation of the pellets to the drilling zone.

Consequently, as emphasized heretofore, pellets of the character defined must be employed to have the separation characteristics required for effective drilling. In this connection it is apparent that the nature of the drilling fluid employed also affects the separation characteristics of the pellets. From this viewpoint it is desirable to employ a drilling fluid having the lowest viscosity and lowest density practical, consistent with other requirements of the drilling fluid. It has been found that the drilling rate obtainable is proportional to the ratio of the density of the pellets to the density of the drilling fluid. This consideration makes the use of air or other gas attractive. Similarly, if a liquid is to be employed, water or other low density liquid is preferably employed. Nonetheless, if considered desirable, drilling muds of the character conventionally used in rotary drilling may be employed.

Recirculation of the pellets in the immediate vicinity of the drilling zone may be accomplished in a number of ways. When the pellets have been forced against a formation by jetted fluid, the fluid flow will carry the pellets outwardly and upwardly in an annular channel along the wall of the bore hole. At some point spaced above the bottom of the bore hole it becomes necessary therefore to separate the entrained pellets from the upflowing drilling fluid. One method by which this may be accomplished is to provide a low velocity fluid zone above the drilling apparatus in which the pellets may settle by gravity into a recirculation system. Such a low velocity zone may be provided by narrowing the cross-sectional area of the apparatus immediately above the drill so as to provide an enlarged annular space in the bore hole. This gravity recirculation can be supplemented or substituted by a mechanical deflection system serving to maintain the pellets in captive recirculation. A shroud may be employed for this purpose of a character substantially blocking the bore hole but containing passages through which drilling fluid and pulverized earth formation may be carried to the surface of the earth.

It is generally desirable in obtaining a suitable ejection of pellets to employ a nozzle assembly utilizing a primary and a secondary jet nozzle. The primary nozzle is employed to convert fluid pumping pressure to velocity energy. Consequently fluid pumped through the primary nozzle is subjected to a substantial pressure drop, of 100 pounds per square inch or more, to provide a constricted directed high velocity jet of fluid. A secondary nozzle is positioned immediately below and concentric with the primary nozzle. The secondary nozzle should have a substantially greater diameter than the primary nozzle to accommodate the total volume of fluid from the primary nozzle in addition to the volume of pellets there entrained. This configuration and arrangement of nozzles, by its nature, creates an aspirating effect which plays a part in the recirculation of the pellets.

The present invention concerns an improved manner of securing efficient separation and recirculation of the pellets in the vicinity of the drilling zone while permitting removal of the drilling fluid from the bore hole for recirculation through the drill string. In a preferred form of the invention a shroud element is positioned around a jet nozzle assembly adapted to eject a high velocity directed flow of fluid entraining the drilling pellets. The upper portion of this shroud element may be perforated or slotted so as to permit unobstructed upward flow of drilling fluid and pulverized earth through the shroud. However, these perforations are sufficiently small to prevent passage of the pellets through the shroud. Consequently, the shroud serves to maintain captive recirculation of the pellets in the immediate vicinity of the drilling zone. This type of recirculation will be identified as "momentum circulation."

The present invention supplements this recirculation technique by employing a gravity separation zone above the shroud referred to. This zone is provided by positioning a sleeve member above the shroud. The upper end of this sleeve member is open while the lower portion of the sleeve may converge so as to join to the shroud referred to adjacent the jet nozzle assembly. The upper gravity separation zone serves to separate any pellets from upflowing drilling fluid which for any reason have escaped from the shroud. For example, if a side wall cavity is encountered, the drilling pellets have the opportunity of bypassing a fixed shroud element of the character referred to. These pellets would ordinarily be carried above the shroud and could not re-enter the pellet circulation system. In accordance with this invention, "gravity" separation means are provided to prevent effective loss of pellets which may otherwise occur.

Preferred embodiments of the invention are illustrated in the accompanying drawings, in which.

Figure 1:
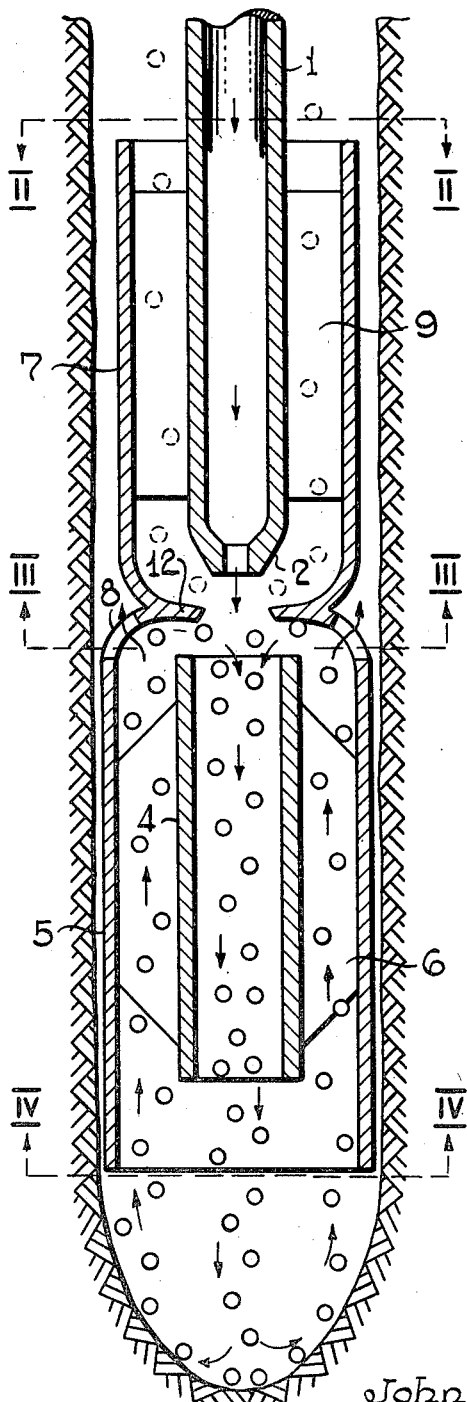
Figure 1 illustrates the simplest form of apparatus embodying the invention, including all of the required essential features. The apparatus is shown in cross-sectional, elevational detail in drilling position in a bore hole.
Figure 2:
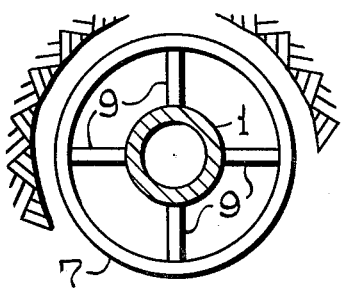
Figure 2 is a cross-sectional view of Figure 1 along the line II—II of Figure 1.

The remaining figures of the drawing illustrate a different embodiment of the invention which at all times employs a combination of momentum and gravity recirculation of the pellets. In these figures:

Figure 5 shows the apparatus in drilling position in cross-sectional, elevational detail;

Figure 6 is a right side view of Figure 5 taken along the line VI—VI showing a cross-section of the apparatus of Figure 5; and Figure 7 is a cross-sectional view of the apparatus of Figure 5 along the line VII—VII.

Referring now to Figures 1 through 4, a drill apparatus is illustrated which may be suspended from a conventional drill string. The apparatus comprises a tubular support member 1 which terminates at its lower end in a nozzle element 2. The tubular support member may be attached to a drill string by conventional means, as for example by the use of threaded couplings. Nozzle 2 serves as a primary nozzle to convert the pumping pressure applied to fluid passing through the drill string to the form of velocity energy. Thus, a high velocity jet of fluid will be propelled downwardly through primary nozzle 2.

Directly below primary nozzle 2 and spaced therefrom is a secondary nozzle element 4. This nozzle is of substantially greater diameter than the primary nozzle 2 and is preferably elongated to secure the efficient entrainment and acceleration of pellets in the fluid passed through this nozzle. A sleeve or shroud element 5 is positioned around the secondary nozzle 4 so as to extend somewhat below the secondary nozzle. This sleeve element is formed to have a diameter which is substantially the diameter normally cut by ejection of pellets through the nozzle assembly referred to. The upper portion of the sleeve element converges toward the axis of the apparatus to provide the inwardly curved surface illustrated. This portion of the shroud 5 terminates between primary nozzle 2 and secondary nozzle 4 so as to leave a central opening substantially the size of the secondary nozzle. The secondary nozzle may be supported by the sleeve element by means of interconnected web elements 6.

A similar sleeve arrangement is provided around and above the primary nozzle 2. This element is designated by numeral 7. However, the external diameter of sleeve 7 is substantially less than the external diameter of sleeve 5. As will be seen, it is necessary that a sufficient annular space be provided about sleeve element 7 in the bore hole to permit upward passage of drilling fluid upwardly therethrough. The lower portion of sleeve element 7 converges inwardly to provide the curved surfaces shown which terminate at a juncture with shroud element 5 between the primary and secondary nozzles the juncture forming a lip 12. Thus sleeve element 7 and shroud element 5 together constitute in effect an elongated open sleeve element that extends substantially below the primary nozzle and also surrounds at least the lower portion of the tubular support member to define therewith an annular space, the sleeve having a constriction intermediate the ends of the sleeve at a region adjacent to and immediately below the primary nozzle element. As will be shown, this constriction will cause pellets passing down through the annular space to be directed into the jet stream of fluid that passes through the primary nozzle and will also cause pellets carried upwardly within the sleeve below the constriction to be directed inwardly into the jet stream. The sleeve element 7 may be fixed to the support member 1 by means of the radially extended ribs 9. It will be observed that in fact all portions of the apparatus described with the exception of the primary nozzle are in turn supported by sleeve element 7.

Figure 3:
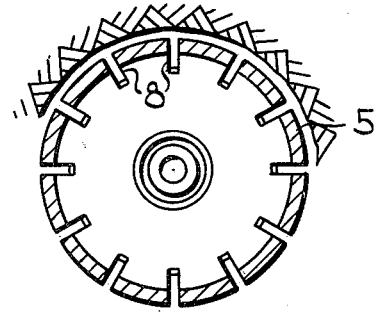
Figure 3 is a cross-sectional view of Figure 1 along the line III—III of Figure 1.
Figure 4:
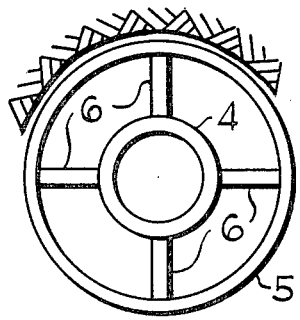
Figure 4 is a cross-sectional view of Figure 1 along the line IV—IV.

As shown in Figure 3 the lower shroud element 5 is provided with a number of perforations or slots 8 through the upper portion adjacent its juncture with the upper sleeve element 7. These slots are employed to permit the passage of drilling fluid and pulverized earth while preventing the passage of pellets.

In the operation of this apparatus, drilling fluid pumped through the drill string is jetted through primary nozzle 2 and secondary nozzle 4. Assuming that pellets are entrained in the secondary nozzle, these pellets will be accelerated and entrained in the fluid while passing through the secondary nozzle. The ejected pellets will follow the general course illustrated in Figure 1. Thus on contacting the central portion of the bore hole, they will be forced outwardly and upwardly along with drilling fluid and pulverized earth. The upflowing drilling fluid will pass through the slots 8 provided in the uppermost portion of the shroud 5 and thence will flow into the annular space in the bore hole between the upper sleeve 7 and the bore hole. However, upflowing pellets beneath shroud 5 will not be enabled to pass through slots 8 of the shroud. Consequently these pellets will be forced along or deflected by the inwardly curved top surface of the shroud so as to be redirected into the path of fluid entering the secondary nozzle. In this manner captive recirculation of the pellets will normally continue.

Assuming that a cavity is encountered in the side wall of the bore hole as drilling proceeds, pellets may be enabled to bypass the lower shroud 5 so as to be forced upwardly along the external side of the shroud. A particular function of the upper sleeve 7 is to permit recapture and recirculation of pellets lost in this manner.

Pellets which succeed in by-passing the lower shroud in the manner indicated will be caught in the high velocity stream of fluid flowing upwardly in the annulus between sleeve 7 and the bore hole. However, on being carried above the upper edge of sleeve 7, a low velocity fluid zone will be encountered. Above sleeve 7 the entire diameter of the bore hole except the portion occupied by the drill pipe is available for the flow of fluid. Consequently above the sleeve 7 the flow velocity of the fluid will be relatively slow. Here pellets entrained in the indicated manner will separate from the drilling fluid so as to drop downwardly within the sleeve 7. These pellets will continue to pass downwardly, particularly under the aspirating effect of the primary nozzle. Caught by this aspirating force the pellets will be pulled into the primary jet of fluid and propelled back into the secondary nozzle for continued recirculation.

An important advantage of the apparatus described concerns the possibility of employing a primary nozzle 2 having a diameter smaller than the diameter of the pellets. This is frequently desirable since in general the larger the pellet size the more rapidly drilling can be conducted. Consequently, it is frequently desirable to employ pellets having a greater diameter than that of the primary nozzle. In the event a shroud of the character described is employed, it becomes a problem to introduce pellets beneath the shroud. Thus a shroud of the character of shroud 5 disclosed would normally be attached directly to the drill string 2 above the primary nozzle. In this case it is apparent that special provision must be made for introducing pellets below the shroud. It will be observed that the apparatus described serves to accomplish this objective without difficulty. When necessary to renew pellets, fresh pellets may simply be dropped into the bore hole external to the drill string. These pellets will drop downwardly so as to be caught in the gravity separation system described to be returned to the pellet recirculation and drilling zone.

Referring now to Figures 5 through 7, a different form of the invention is illustrated. The apparatus here illustrated is similar in general principle to that described. However, nonsymmetrical construction is employed to provide a desirable combination of both the momentum type of recirculation and the gravity type of recirculation of the pellets which has been described.

Referring to Figure 5, fluid forced downwardly through support member 21 and nozzle 20 entrains pellets in the fluid jet ejected therefrom so as to drill the cutting pattern illustrated. These pellets are carried outwardly and upwardly by the circulation of drilling fluid so as to be redirected into the jet of fluid primarily as shown in Figure 6. Thus a perforated shroud element 26 of the character described in conjunction with Figure 1, having openings indicated at 29, is provided to secure redirection and recirculation of the pellets. However, a pair of upwardly extending conduits or passageways 27 and 28 are provided at the upper termination of shroud 26. These passageways 27 and 28, of the configuration shown in Figure 7, pass upwardly above the nozzle 20 to curve inwardly and terminate in the wall of sleeve member 22. Consequently, at all times a circulation of fluid containing a portion of the pellets is maintained upwardly through conduits 27 and 28 to a point above the nozzle 20 within the separation zone provided in sleeve 22. As the linear flow of fluid within sleeve 22 is relatively slow in this portion of the apparatus, pellets may readily separate so as to settle downwardly adjacent the nozzle 20. Again these settling pellets will be affected by the aspiration force of nozzle 20 so as to be entrained in the fluid jet ejected therefrom. Sleeve 22 is fixed to the support member 21 by means of the radially extended ribs 23, similar to the ribs 9 of Figure 1. Sleeve 22 has a lower reduced diameter portion 24 that curves inwardly at its lower end and fastens to the inwardly curved top portion of shroud 26 at 30.

It will be observed that this apparatus provides the basic advantages of the apparatus of Figure 1. Pellets which, for any reason, by-pass the shroud member are positively recirculated in this apparatus.

What is claimed is:

1. A drill bit for drilling bore holes in the earth comprising a tubular support member, a jet nozzle element fixed to the lower termination of the support member and an elongated open sleeve element supported by said support member and surrounding at least the lower portion thereof to define therewith an annular space, said sleeve extending substantially below said nozzle, said sleeve having a constriction intermediate its ends at a region adjacent to and immediately below said nozzle element whereby pellets passing down through said annular space will be directed into the jet stream of fluid passing through said nozzle and whereby pellets carried upwardly by fluid action within said sleeve below said constriction will also be directed inwardly into said jet stream, said sleeve also having at least one perforation communicating between the exterior of said sleeve and the interior of said sleeve below said constriction whereby to permit passage of fluid therethrough while preventing passage of pellets therethrough.

2. A drill bit as defined by claim 1 including a second nozzle element supported by said sleeve below, and in substantial alignment with, said jet nozzle element whereby to facilitate admixture of pellets into said jet stream.

3. A drill bit as defined by claim 1 including at least one elongated conduit exterior of said sleeve and terminating at one end within said sleeve below said constriction and terminating at its other end within said annular space substantially above the lower termination of said nozzle element.

4. The apparatus defined by claim 1 in which the sleeve element above the said nozzle has a substantially smaller diameter than the sleeve element below the said nozzle.

5. A drill bit for drilling bore holes in the earth comprising in combination: a nozzle element attachable to a drill string, a first sleeve element encircling said nozzle element and defining therewith an annular space, said sleeve element terminating at its lower end in a constricted portion below said nozzle element, a second sleeve element positioned below said first sleeve element in substantially coaxial alignment therewith and terminating at its upper end in an inwardly curved slotted shroud portion joined to said constricted portion of said first sleeve.

6. A drill bit as defined by claim 5 including a pair of conduits positioned exterior of said first sleeve and terminating at their lower end within the shroud portion of said second sleeve and at their upper end within said annular space substantially above the lower termination of said nozzle element.

7. A pellet impact drill bit for ejection of directed pellets comprising in combination: a first nozzle element attachable to a drill string, a second nozzle coaxial with said nozzle but fixed below said first nozzle at a spaced distance therefrom, a first sleeve element encircling and extending below said second nozzle, said first sleeve element having a slotted converging portion between the first and second nozzles, and a second sleeve element encircling and extending above said first nozzle, having a converging portion joined to said converging portion of the first sleeve between the first and second nozzles.

8. The apparatus defined by claim 7 in which the sleeve element above the said nozzle has a substantially smaller diameter than the sleeve element below the said nozzle.

References Cited in the file of this patent

UNITED STATES PATENTS

| | | |
|---|---|---|
| 1,502,851 | Gale | July 29, 1924 |
| 1,540,882 | Hansen | June 9, 1925 |
| 2,072,627 | Zublin | Mar. 2, 1937 |
| 2,233,260 | Hawthorne | Feb. 25, 1941 |